Aug. 21, 1928.  
F. M. REID  
1,681,433  
VEHICLE SPRING SUSPENSION  
Filed Aug. 14, 1925 2 Sheets-Sheet 1

INVENTOR.
Frederick Malcolm Reid

Stuart C Barnes
ATTORNEY.

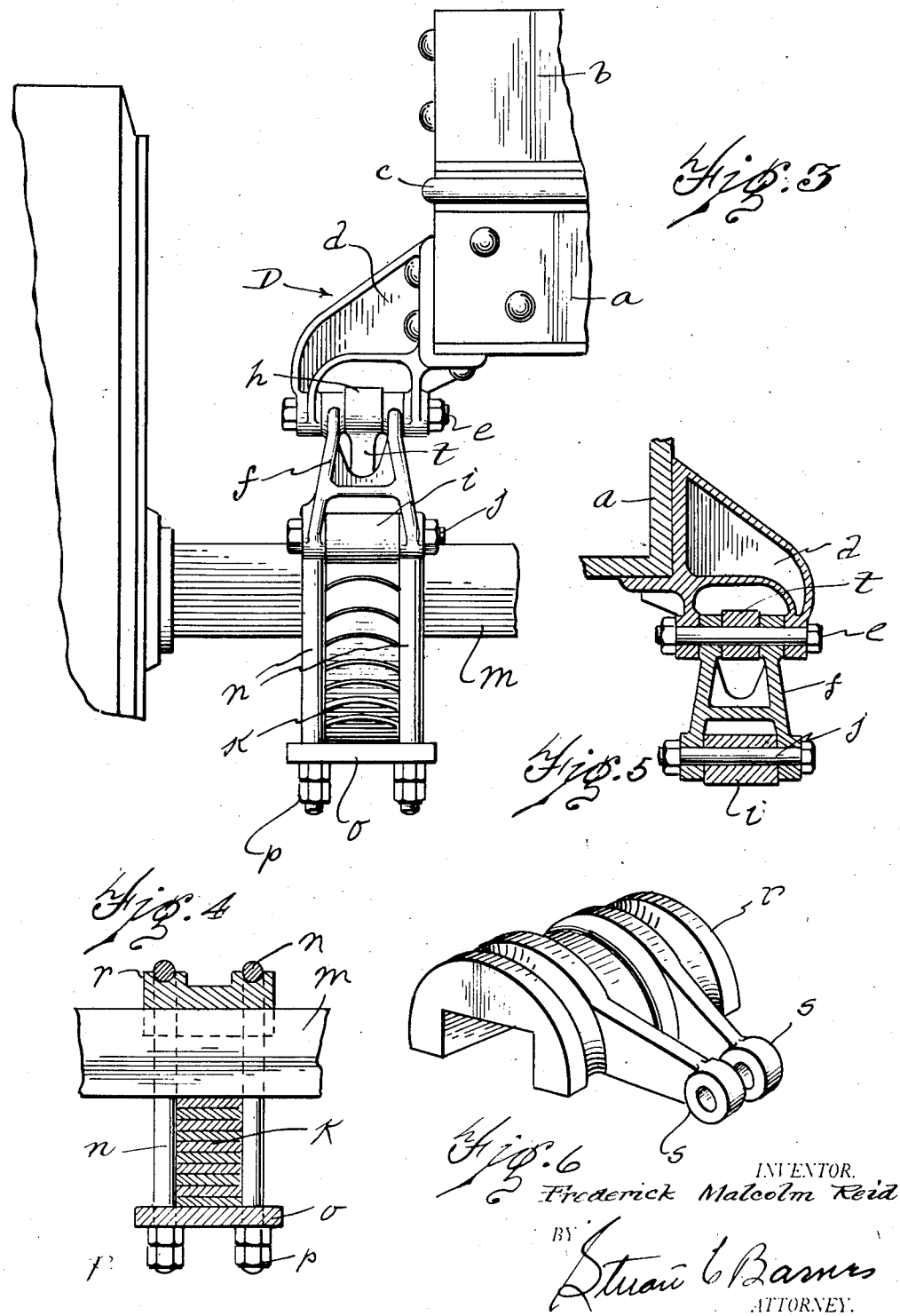

Patented Aug. 21, 1928.

1,681,433

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

VEHICLE-SPRING SUSPENSION.

Application filed August 14, 1925. Serial No. 50,166.

This invention relates to a spring suspension of vehicles, especially the gear frame of a trailer.

It is the object of the invention to provide a special form of spring suspension which will permit the springs to be under-slung on the axle and which will form a strong and reliable support for the gear frame, and do away with the necessity of a cross rod under the chassis frame for bracing the spring hangers.

In the prior application 698,604, there is shown a gear frame suspended on spring hangers in which the springs are carried above the sides of the gear frame. This construction is a very good one, but it is found in actual practice it is desirable in this form of spring hanger to have the shackle bolt on which the radius rod rocks extend clear across under the gear frame for the purpose of reinforcement.

In the present construction for light duty trailers, it is unnecessary to extend the shackle or radius rod bolt under the gear frame, as the hanger brackets can be constructed of such a cross section, preferably a T-section, as to carry all the strains without the help of such a connecting bar underneath the chassis frame.

Referring to the drawings:

Fig. 3 is a fragmentary front elevation of a trailer showing the suspension.

Fig. 4 is a section on the line 4—4 of Fig. 2.

Fig. 5 is a section on the line 5—5 of Fig. 1.

Fig. 6 is a perspective of the radius rod axle clip.

Figure 1:
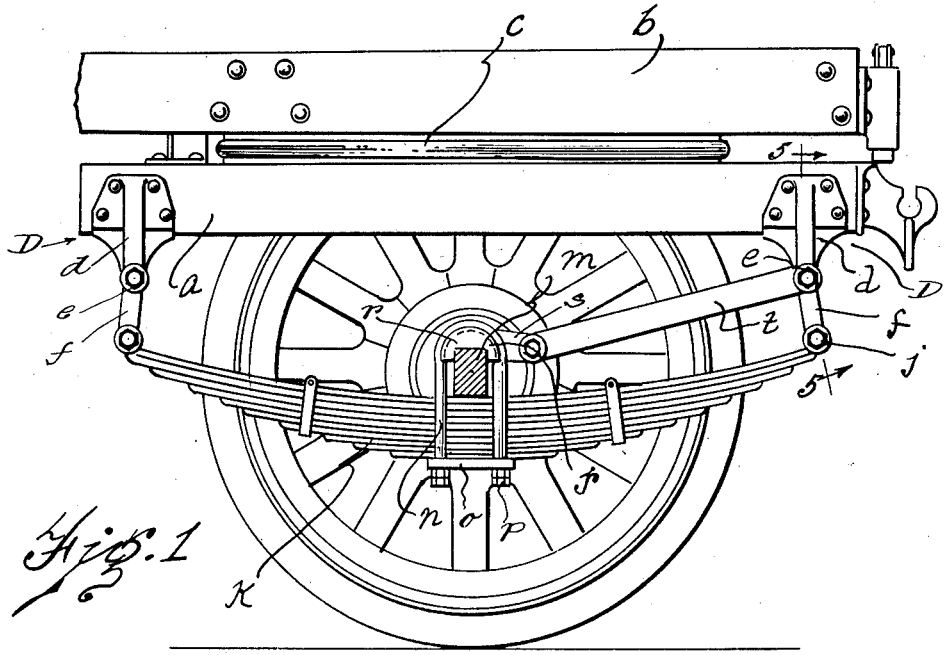
Fig. 1 is a side elevation of a portion of a trailer showing the improved spring suspension.
Figure 2:
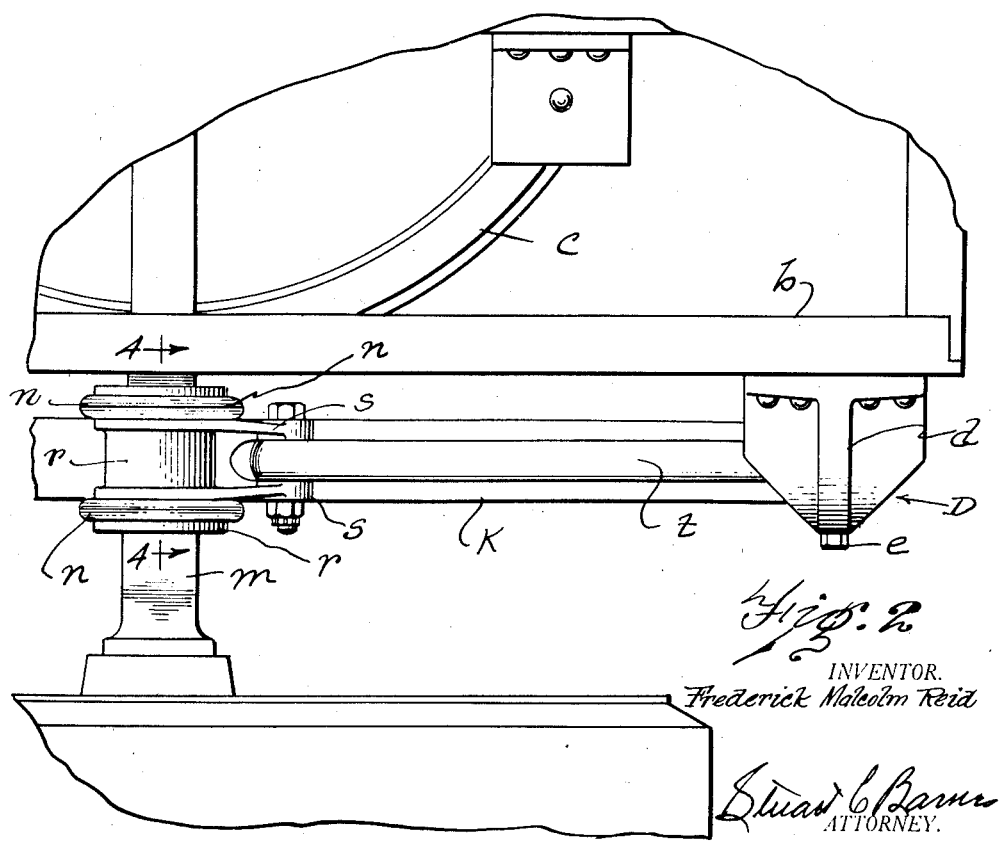
Fig. 2 is a plan view of the same.

$a$ designates what is called in trailer practice "a gear frame", that is, it is the frame of the truck located under the chassis frame $b$ and rotatable with respect thereto on the fifth wheel $c$.

Riveted to the sides of the gear frame are the spring hangers D in the form of angle iron brackets which can also be riveted to the bottom of the gear frame to insure a strong and firm anchorage to that member. This hanger is provided with an outwardly extending web or yoke $d$ of T-section, provided at its ends with the bolt eyes through which passes a bolt $e$. A bifurcated shackle $f$ is supported on this bolt between the yoke arms and within the bifurcation is supported on the bolt the radius rod $t$. The shackle $f$ supports at its lower end the bolt $j$ over which curls the spring eye $i$.

The heavy leaf spring $k$ is under-slung on the axle $m$ by means of the two U bolts $n$ and the plate $o$ together with the nuts $p$. These U springs hold the radius rod clip $r$ to the top of the axle and this is provided with a pair of arms $s$ which support the other end of the radius rod $t$.

From the above description, it will be apparent that the hanger brackets can be made of an angle metal section such as a T section to give it relatively great strength. The radius rod is above the spring, contrary to the usual practice.

What I claim is:

1. A spring suspension, having in combination with a vehicle frame and axle, a spring underslung on the axle, bolts embracing the axle for securing the spring thereto, a clip member on the upper side of the axle and held in place by the spring securing bolts, this clip having a portion for connection with a radius rod, a bracket secured to the frame having a projecting yoke member, a pin extending across the yoke for fastening one end of the radius rod thereto, and a spring shackle also fastened to the bracket by this pin, this spring shackle extending downwardly and having the spring secured to its lower end.

2. A spring suspension having in combination with a vehicle frame and axle, a spring underslung on the axle, U bolts extending over the axle for securing spring thereto, a clip member on the upper side of the axle, this clip member having grooves for receiving the U bolts and a projecting portion for connection with one end of a radius rod, a bracket secured to the frame having a projecting yoke member, a pin extending across the yoke for fastening one end of the radius rod thereto, and a bifurcated spring shackle also fastened to the bracket by this pin, the bifurcated part of the shackle lying within the yoke of the bracket with the radius rod lying between the bifurcated part, this spring shackle extending downwardly and having the spring secured to its lower end.

In testimony whereof I affix my signature.

FREDERICK MALCOLM REID.